United States Patent
Hughes et al.

(10) Patent No.: US 7,797,751 B1
(45) Date of Patent: Sep. 14, 2010

(54) NONCE STRUCTURE FOR STORAGE DEVICES

(75) Inventors: James P. Hughes, Herndon, VA (US); Alexander Stewart, Louisville, CO (US); Dwayne A. Edling, Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 1062 days.

(21) Appl. No.: 11/389,835

(22) Filed: Mar. 27, 2006

(51) Int. Cl.
*G06F 15/16* (2006.01)

(52) U.S. Cl. .............................. 726/26; 726/18; 726/19; 726/20; 726/21

(58) Field of Classification Search .................. 713/153, 713/163, 183, 193, 340, 164, 150, 182, 190, 713/191; 709/217, 203, 223, 237, 225, 229, 709/227, 211, 208; 726/22, 14, 13, 11, 34, 726/25, 26, 27, 18, 19, 20; 380/42, 55, 58, 380/46; 711/163, 100, 200

See application file for complete search history.

(56) References Cited

U.S. PATENT DOCUMENTS

| 7,370,166 | B1* | 5/2008 | Ramesh et al. | ............... 711/163 |
| 7,392,399 | B2* | 6/2008 | Grohoski et al. | ............ 713/189 |
| 7,472,285 | B2* | 12/2008 | Graunke et al. | ............. 713/193 |
| 7,505,595 | B2* | 3/2009 | Lee et al. | .................... 380/270 |
| 2005/0257074 | A1* | 11/2005 | Alkove et al. | ............... 713/193 |

* cited by examiner

*Primary Examiner*—Kieu Oanh Bui
*Assistant Examiner*—Nega Woldemariam
(74) *Attorney, Agent, or Firm*—Brooks Kushman P.C.

(57) ABSTRACT

A multiple field nonce particularly suited for use in encryption algorithms associated with data storage has at least one field unique to each data storage device to avoid the possibility of the same nonce value being used to store more than one data string. Additional fields may be based on the number of times at least one encryption key is associated with the storage device and on a number assigned to the particular string of data.

12 Claims, 3 Drawing Sheets

NONCE STRUCTURE FOR STORAGE DEVICES

BACKGROUND OF THE INVENTION

1. Field of the Invention

The present invention relates to encrypting data held by data storage devices.

2. Background Art

Protecting data from unauthorized access is becoming increasingly important. Both the amount and kinds of data generated and requiring protection continue to increase. Moreover, attacks by those not authorized to access the data grow in frequency and sophistication. An emerging need is for the encryption of data held in storage devices, referred to as "at-rest data encryption."

Encryption works securely as long as the cipher text output is truly random. Anything that detracts from pure randomness helps an attacker. Most encryption algorithms feature two control inputs, the key which controls the encryption algorithm and an initialization vector that sets a "seed" for the encryption process. If the same key and the same initialization vector are used to encrypt data that has any repetitive structure, an attacker will see a repetitive structure in the encrypted data and will have a starting point for an attack.

One technique to avoid repetitive encrypted data is to use a nonce for the initialization vector that is different for every string encrypted. Nonce is a term used in encryption technology to refer to an initialization vector value that is unique for every data string that is encrypted. It need not be random, for example an incrementing value forms a valid nonce, but must be unique. Thus, even if every input string was identical, the encrypted data would be different for every string. The lack of repetition in the cipher text provides no opening for an attack.

Application of nonce-based encryption to a removable storage device, such as a tape drive, generates a particular problem for implementation since it is possible for a very large number of independent tape drives to be encrypting data using the same encryption key or keys. The requirement that the nonce be non-repeating in this environment creates a specific problem that must be addressed in the definition and implementation of the nonce.

SUMMARY OF THE INVENTION

The present invention implements a multiple field nonce particularly suited for use in encryption algorithms associated with data storage. The nonce has at least one field unique to each device to avoid the possibility of the same nonce value being used by different storage devices to store more than one data string.

A method for generating a nonce for encrypting a particular string of data stored on a particular storage device is provided. A first portion of the nonce is generated based on a unique identifier for the storage device upon which the encrypted data is to be stored. A second portion of the nonce is generated based on the number of times at least one encryption key is associated with the storage device. A third portion of the nonce is generated based on a number assigned to the particular string of data.

The storage device may be a tape drive, disk drive, data canister, or the like. Storage media includes magnetic disks and tapes, optical disks and tapes, electronic media, microelectromechanical media, holographic media, or any other conceivable storage media.

In another embodiment of the present invention, the number assigned to the particular data string is based on a counter counting the number of data strings encrypted. The counter hardware may reset when power is supplied. The counter may also reset when one or more new encryption keys are associated with the storage device.

In another embodiment of the present invention, at least one encryption key is associated with the storage device each time power is applied to the storage device.

A system for generating a nonce that may be used to encrypt data is also provided. The system typically includes a volatile memory, a non-volatile memory, and control logic operative to form the nonce. A first portion of the nonce is formed based on a unique identifier stored in the non-volatile memory. A second portion of the nonce is formed based on the number of times at least one encryption key is stored in the volatile memory. A third portion of the nonce is formed based on the parameters of previously encrypted data strings such as, for example, the number of data strings previously encrypted, the number of bytes previously encrypted, and the like.

A nonce is also generated from a string value based on the particular string of data to be encrypted and from an identifier value based on the particular removable storage device upon which the encrypted string of data is to be stored.

The various objects, features, and advantages of the present invention are readily apparent from this specification including the following detailed description of the best modes for carrying out the invention when taken in connection with the accompanying drawings.

DETAILED DESCRIPTION OF THE PREFERRED EMBODIMENT(S)

Figure 1:
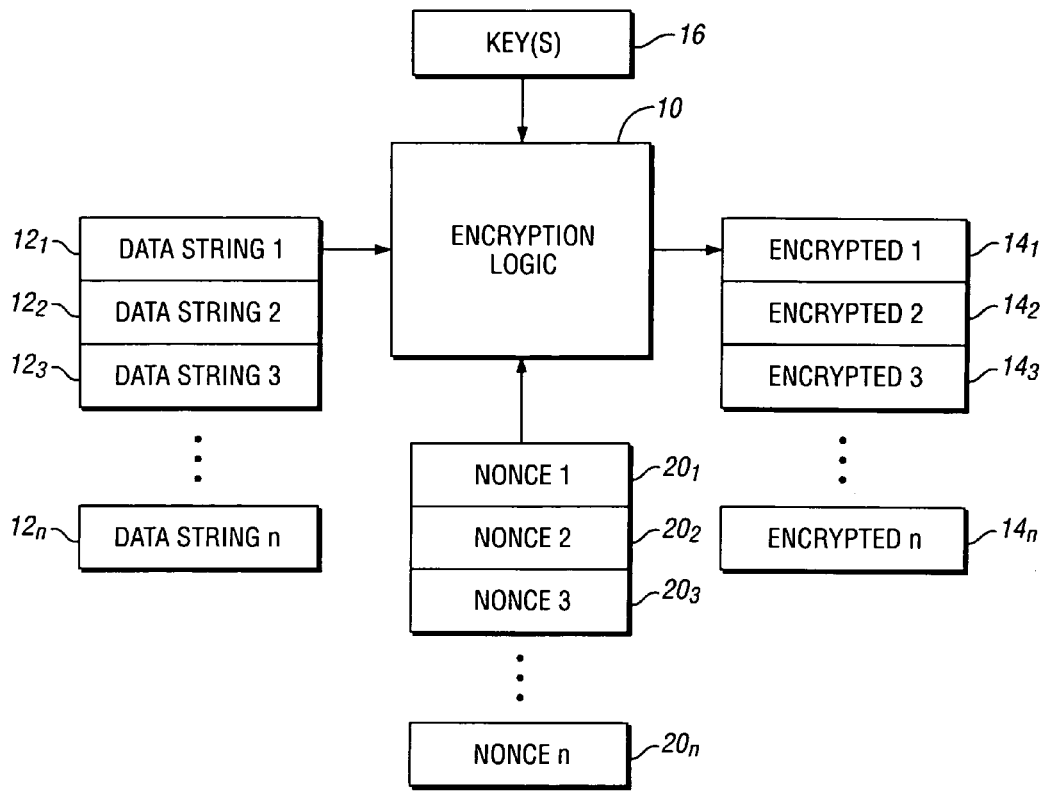
FIG. 1 is a block diagram illustrating encryption according to an embodiment of the present invention.

Referring to FIG. 1, a block diagram illustrating encryption according to an embodiment of the present invention is shown. Encryption logic 10 encrypts a set of data strings $12_1$, $12_2$, $12_3$ ... $12_n$ to produce a set of encrypted data $14_1$, $14_2$, $14_3$ ... $14_n$. Encryption logic 10 can implement any one or more of a variety of encryption algorithms including the CCM mode of the Advanced Encryption Algorithm. Encryption logic 10 uses one or more encryption keys 16 and a plurality of nonces $20_1$, $20_2$, $20_3$ ... $20_n$. Each nonce $20_i$ is uniquely associated with one data string $12_i$. Encryption logic 10 may be distributed or copied throughout a plurality of data storage devices. For maximum security, each nonce $20_i$ should be unique across all embodiments of the encryption logic 10.

Figure 2:
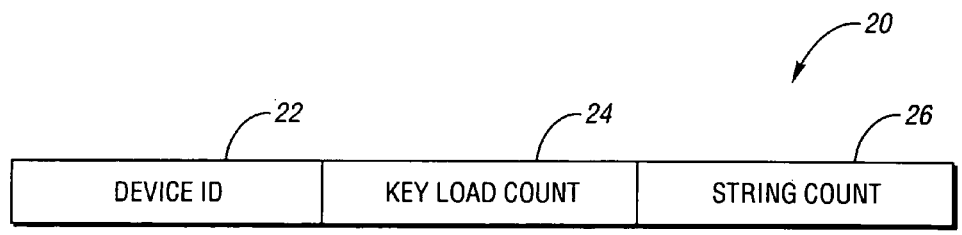
FIG. 2 is a schematic diagram illustrating a nonce format according to an embodiment of the present invention.

Referring also to FIG. 2, a schematic diagram illustrating a nonce format according to an embodiment of the present invention is shown. Nonce 20 has a plurality of fields. At least one first field 22 identifies the storage device. This may be accomplished, for example, through the use of a device identifier such as a serial number, slot number, network identifier, or the like, provided that such identifier can be guaranteed to be unique.

A second nonce field 24 is updated each time the storage device is power cycled or when there is a change in the current one or more encryption keys being used by the storage device. One technique for generating second field 24 is to keep a count of the number of times encryption keys have been loaded into the storage device. Alternatively, a value for this second nonce field may be sent when the key is loaded into the storage device.

A third field 26 provides a unique value for each data string being encrypted by nonce 20. In one embodiment, field 26 may be based on a count of data strings 12 operated on by the encryption logic. If the storage device uses non-removable storage media, third field 26 may represent an address or storage location on the media. For example, third field 26 may be based on a sector number for a hard disk drive or an address of a solid state memory location.

The fields 22, 24, 26 comprising nonce 20 may be positioned in any order. Information from fields 22, 24, 26 may be interleaved in any manner. In addition, information from fields 22, 24, 26 may be algorithmically combined in any manner to form nonce 20 so long as each nonce 20 is a unique value.

Figure 3:
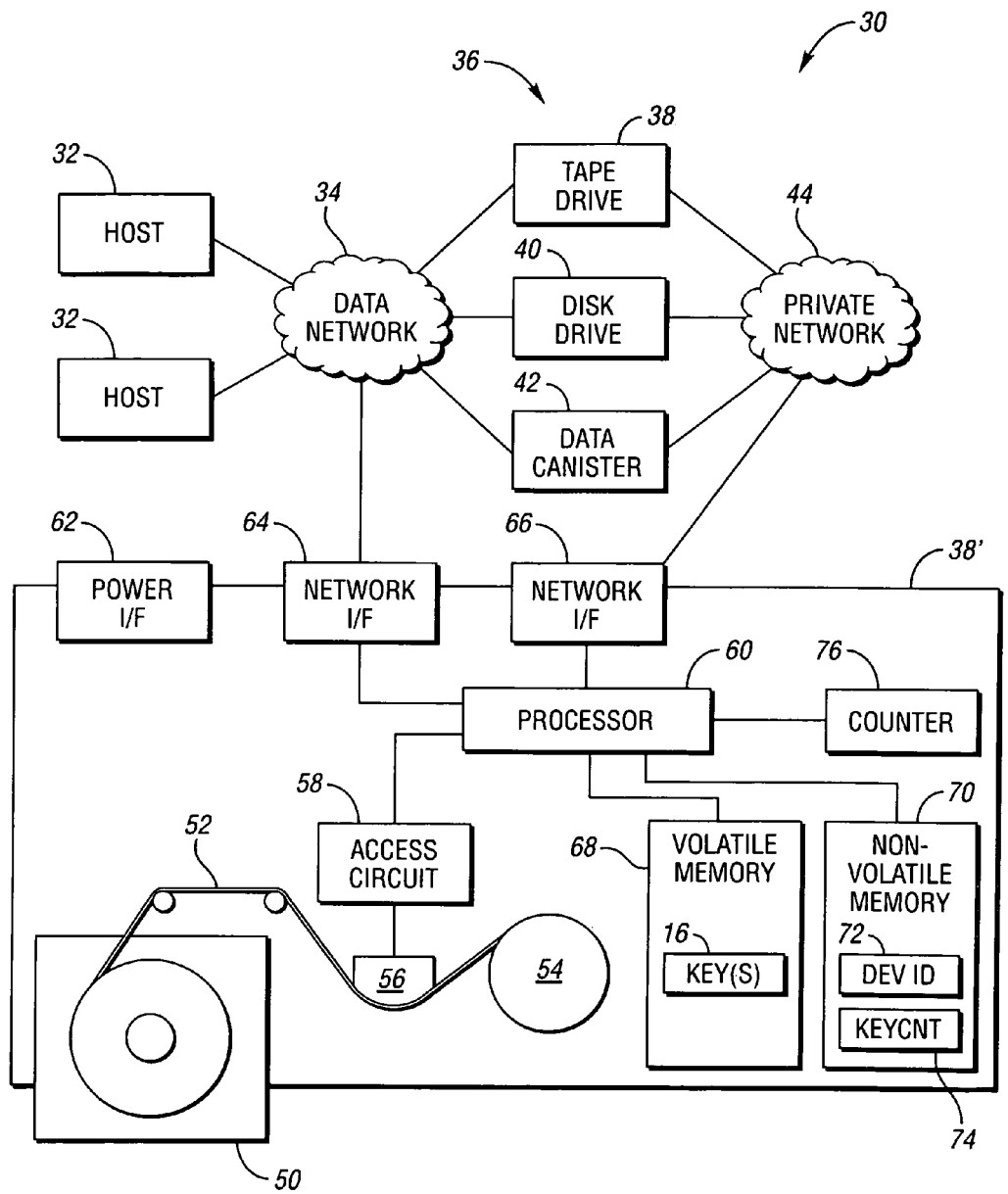
FIG. 3 is a data encryption system according to an embodiment of the present invention.

Referring also to FIG. 3, a data encryption system according to an embodiment of the present invention is shown. A data encryption system, shown generally by 30, typically includes one or more data producers and/or consumers such as host computers 32. Data network 34 interconnects host computers 32 with a plurality of storage devices, shown generally be 36. Storage devices 36 may include encryption logic for encrypting data. Any type of storage device 36 may be used with the present invention including tape drive 38, disk drive 40, and data canister 42. Tape drive 38 accepts removable optical or magnetic cartridges or cassettes. Disk drive 40 may use hard or flexible optical or magnetic disks that may be removable or may be fixedly enclosed in disk drive 40. Data canisters 42 include a wide variety of storage devices such as collections of one or more disk drives, tape drives, solid state memory, magnetic bubble memory, holographic memory, microelectromechanical system (MEMS) storage devices, and the like. Storage devices 36 may be removable in the sense that they may be disconnected from data network 34. The ability to remove storage devices 36 may be intentionally designed into data encryption system 30 such as, for example, in the case of hot-swappable drives or pluggable data canisters. However, removability also encompasses the possibility that otherwise permanently affixed storage devices 36 may be removed by unauthorized personnel attempting to misappropriate storage device 36 or the data held therein.

In the embodiment illustrated in FIG. 3, storage devices 36 are interconnected through private network 44 separate from data network 34. Private network 44 may be used to exchange information about the operation of storage devices 36, although for security reasons this private network may be used exclusively for key transactions. Private network 44 is primarily used to distribute encryption keys to storage devices 36. In the absence of, or together with, private network 44, storage devices 36 may include a separate connection for loading encryption keys.

FIG. 3 includes a block diagram of an exemplary tape drive 38'. Tape drive 38' accepts tape cartridge 50 containing magnetic data tape 52 which is pulled by take-up reel 54 past write head 56. Access circuit 58 drives write head 56 based on write data provided by processor 60.

Tape drive 38' includes a number of interfaces. Power interface 62 provides electrical energy for powering the elements of tape drive 38' through connections omitted for clarity. Network interface 64 allows tape drive 38' to interconnect with data network 34. Data to be encrypted by tape drive 38' is received through network interface 64. Network interface 66 connects tape drive 38' with private network 44. Encryption keys may be loaded into tape drive 38' through network interface 66.

Tape drive 38' includes volatile memory 68 and non-volatile memory 70 accessible by processor 60. One or more encryption keys 16 are stored in volatile memory 68 so that if power interface 62 is disconnected, encryption keys 16 will be deleted from tape drive 38'. Device identifier 72 and key load count 74 are stored in non-volatile memory 70. Device ID 72 may also be obtained by drive 38' based on the location, address, or slot in which drive 38' is connected or installed.

Tape drive 38' also includes counter 76 for counting the number of data strings 12 encrypted by tape drive 38'. Counter 76 may be implemented in hardware with no storage function. Counter 76 may be implemented as one or more of a separate hardware function, a register within processor 60, a location within volatile memory 68, or any similar storage technique.

Encrypting drive 38, 40, 42 will typically write a large number of encrypted blocks over the lifetime of the drive. In addition, drives 38, 40, 42 will see an indeterminate number of power cycles and an indeterminate number of drives will exist and will be writing encrypted data. Nonce 20 must be defined such that none of these conditions can result in a repeated value for nonce 20. The definition of nonce 20 must also place no restriction in the performance of drive 38, 40, 42 such as requiring undue time consuming firmware overhead.

To meet these and other requirements, nonce 20 is structured into three segments. A first segment 22 contains a unique identifier such as, for example, device ID 72. A second segment 24 is based on the number of times encryption keys 16 are loaded into drive 38, 40, 42. A third segment 26 is used to define a number for each encrypted string of data.

Definition of a number for each encrypted string of data can be readily achieved by incrementing counter 76 for each written string of data. For short string lengths and with high data transfer rates of many tape drives 38, 40, 42, counter 76 will increment very rapidly, typically on the order of once per microsecond. As long as drive 38, 40, 42 remains powered, this is not an issue. But if drive 38, 40, 42 is powered off, counter 76 will reset, losing the last count. Due to the high rate at which counter 76 increments, firmware overhead requirements, and the fact that the life-time count of encrypted strings would require an extremely large memory, it is not practical to store this data in non-volatile memory 70. In an embodiment, counter 76 will be preset to a value of one following each power cycle so that an all-zero value can only occur as an error condition providing a means of fault detection or diagnostic testing.

When drive 38, 40, 42 is powered off, the second segment 24 of nonce 20 comes into play. String counter or block counter 76 will reset when power is applied to drive 38, 40, 42. Using the second segment 24 and third segment 26 of nonce 20 together guarantees that the nonce value can never be the same value even for blocks written when drive 38, 40, 42 is powered on or off repeatedly. Processor 60 reloads keys 16 from an outside source, such as through private network 44, following a power cycle so that each time the power is cycled, a key load operation takes place and key load count 74 is incremented. In a new drive 38, 40, 42, the value in key load count 74 is set to one. Key loads are relatively infrequent so that there is no performance penalty by storing key load count 74 in non-volatile memory 70. Key loads can also take place independently of power cycles such as, for example, if an operator of drive 38, 40, 42 wishes to change encryption keys 16. This, of itself, does not require a reset of counter 76. But using key loads as a trigger for resetting counter 76 and incrementing key load count 74 following a power cycle provides a simple implementation.

It is possible for second segment 24 and third segment 26 of nonce 20 to be repeated for encrypted strings written by different drives 38, 40, 42. One possible additional step in achieving non-repeatability of nonce 20 involves first segment 22. This segment contains a unique identifier such as serial number or device ID 72 held in non-volatile memory 70. This number may be assigned, for example, in the manufacturing process, to assure that a serial number is never repeated between drives 38, 40, 42.

Figure 4:
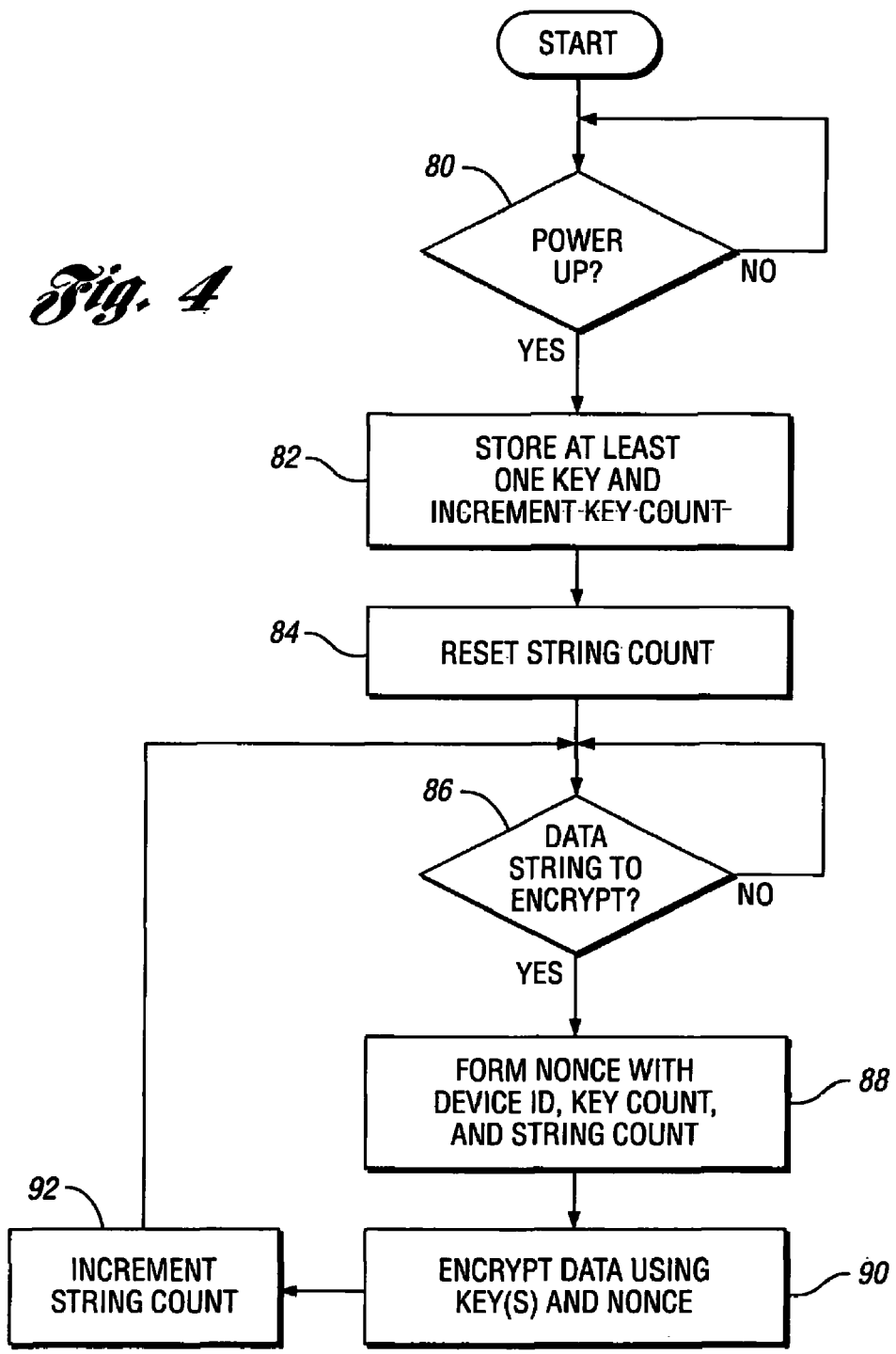
FIG. 4 is a flow diagram illustrating data encryption in which a nonce is formed according to an embodiment of the present invention.

Referring now to FIG. 4, a flow diagram illustrating data encryption in which a nonce is formed according to an embodiment of the present invention is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form for ease of illustration.

A check is made to determine if power has been applied, as in block 80. Alternatively, or in addition to a check for power up, a determination may also be made for other reasons to load encryption keys. For example, a user may signal new keys to be loaded in a drive. Encryption keys may expire with the passage of time. New encryption keys may be loaded upon detection of an overflow of the block or segment counter. Certain security conditions or violations may also necessitate loading new security keys.

At least one security key is stored and the key count incremented, as in block 82. The string or block count is reset, as in block 84. A check is then made, as in block 86, to determine if any data strings require encryption. This check may be based on the arrival of data at a drive, the accumulation of a particular amount of data, the reception of a particular type of data or signal, and the like.

If a string of data is to be encrypted, a nonce is formed with the drive device ID, key count, and string count, as in block 88. The nonce may be formed with these values in any order or interleaved, as required by the encryption scheme used. In addition, the various values used to form the nonce may be combined logically or arithmetically. The data is then encrypted using the encryption keys and the nonce, as in block 90. The string counter is incremented, as in block 92. A check is then made for the next data string to encrypt, as in block 86.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method, using a system including a volatile memory, a nonvolatile memory, and control logic, the method for generating a nonce for encrypting a particular string of data stored on a particular removable storage device, the particular string of data one of a plurality of strings of data, the particular removable storage device one of a plurality of removable storage devices, the method comprising:
   generating, with the control logic, a first portion of the nonce based on a unique identifier stored in the nonvolatile memory for the particular removable storage device upon which the encrypted data is to be stored;
   generating, with the control logic, a second portion of the nonce based on the number of times at least one encryption key is associated with the particular removable storage device by storing the at least one encryption key in volatile memory; and
   generating, with the control logic, a third portion of the nonce based on a number assigned to the particular string of data,
   wherein the at least one encryption key is associated with the particular removable storage device each time power is applied to the particular removable storage device.

2. The method of generating a nonce as in claim 1 wherein the particular removable storage device is a tape drive.

3. The method of generating a nonce as in claim 1 wherein the particular removable storage device is a disk drive.

4. The method of generating a nonce as in claim 1 wherein the particular removable storage device is a data canister.

5. The method of generating a nonce as in claim 1 wherein the particular removable storage device is a holographic storage device.

6. The method of generating a nonce as in claim 1 wherein the particular removable storage device is an optical storage device.

7. The method of generating a nonce as in claim 1 wherein the number assigned to the particular data string is based on a counter counting the number of data strings encrypted.

8. The method of generating a nonce as in claim 7 wherein the counter is reset when power is supplied.

9. The method of generating a nonce as in claim 7 wherein the counter value is held in the volatile memory.

10. A system for generating a nonce that is used to encrypt data comprising:
    a volatile memory;
    a nonvolatile memory; and
    control logic in communication with the volatile memory and the non-volatile memory, the control logic operative to
    (a) form a first portion of the nonce based on a unique identifier stored in the nonvolatile memory for a particular removable storage device upon which the encrypted data is to be stored,
    (b) form a second portion of the nonce based on the number of times at least one encryption key is associated with the particular removable storage device by storing the at least one encryption key in volatile memory, and
    (c) form a third portion of the nonce based on previously encrypted data strings,
    wherein the at least one encryption key is associated with the particular removable storage device each time power is applied to the particular removable storage device.

11. The system for generating a nonce as in claim 10 further comprising a counter counting each encrypted data string.

12. The system for generating a nonce as in claim 10 wherein the nonvolatile memory holds the number of times the at least one encryption key is stored in volatile memory.

* * * * *